(12) United States Patent
Kim et al.

(10) Patent No.: US 6,904,012 B1
(45) Date of Patent: Jun. 7, 2005

(54) APPARATUS AND METHOD FOR ALLOCATING FORWARD COMMON CHANNELS IN CDMA COMMUNICATION SYSTEM

(75) Inventors: Jae-Yoel Kim, Kunpo-shi (KR); Hee-Won Kang, Seoul (KR); Jae-Min Ahn, Kangnam-gu (KR); Seung-Joo Maeng, Songnam-shi (KR)

(73) Assignee: Samsung Electronics Co., Ltd. (KR)

( * ) Notice: Subject to any disclaimer, the term of this patent is extended or adjusted under 35 U.S.C. 154(b) by 0 days.

(21) Appl. No.: 09/503,925

(22) Filed: Feb. 14, 2000

(30) Foreign Application Priority Data

Feb. 13, 1999 (KR) .......................................... 1999-5298

(51) Int. Cl.$^7$ ................................................ H04J 11/00
(52) U.S. Cl. ...................................... 370/209; 370/335
(58) Field of Search ............................... 370/209, 335, 370/342

(56) References Cited

U.S. PATENT DOCUMENTS

| | | | | |
|---|---|---|---|---|
| 5,608,778 | A | * | 3/1997 | Partridge |
| 5,751,761 | A | * | 5/1998 | Gilhousen |
| 6,072,987 | A | * | 6/2000 | Willey ....................... 340/7.43 |
| 6,088,347 | A | * | 7/2000 | Minn et al. |
| 6,256,301 | B1 | * | 7/2001 | Tiedemann, Jr. et al. |

FOREIGN PATENT DOCUMENTS

| CA | 2362740 | 2/2000 |
|---|---|---|
| WO | WO 96/19879 | 6/1996 |

OTHER PUBLICATIONS

I et al., Variable Spreading Gain CDMA with Adaptive Control for True Packet Switching Wireless Network, 1995, IEEE, pp. 725–730.*

Adachi et al., Tree–structured generation of orthogonal spreading codes with different lengths for forward link of DS–CDMA mobile radio, Jan. 2, 1997, Electronics Letters, vol. 33, No. 1, pp 27–28.*

* cited by examiner

*Primary Examiner*—Chi Pham
*Assistant Examiner*—Keith M. George
(74) *Attorney, Agent, or Firm*—Dilworth & Barrese, LLP

(57) ABSTRACT

A device for allocating a forward common channel in a CDMA (Code Division Multiple Access) communication system, including: a plurality of channel transmitters; a storage medium for storing, as orthogonal code numbers for the forward common channel used in a second CDMA communication system, orthogonal code numbers which cannot maintain an orthogonality due to an orthogonal code that the forward common channel uses at a maximum data rate, the orthogonal code being used in a first CDMA communication system; and a controller for reading the orthogonal code numbers from the storage medium according to mobile station type information from a mobile station, and allocating a specific forward common channel such that forward common channel message is spread and transmitted by a corresponding one of the channel transmitters with a specific one of the read orthogonal code numbers.

42 Claims, 9 Drawing Sheets

FIG. 3

| USER #1<br>DATA RATE: 38.4kbps<br>WALSH LENGTH: 64<br>WALSH CODE: W8 | SYMBOL #1<br>8TH WALSH CODE<br>($W^8$) | SYMBOL #2<br>8TH WALSH CODE<br>($W^8$) | SYMBOL #3<br>8TH WALSH CODE<br>($W^8$) | SYMBOL #4<br>8TH WALSH CODE<br>($W^8$) |
|---|---|---|---|---|
| USER #2<br>DATA RATE: 19.2kbps<br>WALSH LENGTH: 128<br>WALSH CODE: W8 | SYMBOL #1<br>8TH WALSH CODE<br>($W^8$) | | SYMBOL #2<br>8TH WALSH CODE<br>($W^8$) | |
| USER #3<br>DATA RATE: 19.2kbps<br>WALSH LENGTH: 128<br>WALSH CODE: W72 | SYMBOL #1<br>8TH WALSH CODE<br>($\overline{W^8}$) | | SYMBOL #2<br>8TH WALSH CODE<br>($\overline{W^8}$) | |
| USER #4<br>DATA RATE: 9.6kbps<br>WALSH LENGTH: 256<br>WALSH CODE: W8 | SYMBOL<br>8TH WALSH CODE<br>($W^8$) | | | |
| USER #5<br>DATA RATE: 9.6kbps<br>WALSH LENGTH: 256<br>WALSH CODE: W72 | SYMBOL<br>8TH WALSH CODE<br>($\overline{W^8}$) | | | |
| USER #6<br>DATA RATE: 9.6kbps<br>WALSH LENGTH: 256<br>WALSH CODE: W136 | SYMBOL<br>8TH WALSH CODE<br>($\overline{W^8}$) | | | |
| USER #7<br>DATA RATE: 9.6kbps<br>WALSH LENGTH: 256<br>WALSH CODE: W200 | SYMBOL<br>8TH WALSH CODE<br>($\overline{W^8}$) | | | |

APPARATUS AND METHOD FOR ALLOCATING FORWARD COMMON CHANNELS IN CDMA COMMUNICATION SYSTEM

PRIORITY

This application claims priority to an application entitled "Apparatus and Method for Allocating Paging Channels in CDMA Communication System" filed in the Korean Industrial Property Office on Feb. 13, 1999 and assigned Serial No. 99-5298, the contents of which are hereby incorporated by reference.

BACKGROUND OF THE INVENTION

1. Field of the Invention

The present invention relates generally to a CDMA communication system, and in particular, to a device and method for allocating Forward Common Channels in the 2 Generation (IS-95) and 3 Generation (IMT-2000) CDMA systems.

2. Description of the Related Art

In order to increase channel capacity, a CDMA (Code Division Multiple Access) communication system separates channels using orthogonal codes. For example, a forward link of an IS-95 system performs channel separation using orthogonal codes. A reverse link can also perform channel separation using the orthogonal codes through time alignment. An example of an orthogonal code that is typically used is a Walsh code. The number of available orthogonal codes is determined depending upon a modulation method and a minimum data rate.

An IS-95 Forward Common Channel which separates channels using the fixed orthogonal codes, includes a pilot channel, a sync channel and a paging channel. The pilot channel constantly uses a $0^{th}$ Walsh code (which is a Walsh code having a Walsh number 0), the sync channel uses a $32^{nd}$ Walsh code, and the paging channel uses $1^{st}$ to $7^{th}$ Walsh codes. In the existing IS-95 system having the above channel structure, all the channels have relatively short frame length and thus, always use the Walsh codes of the same length (e.g., 64 chips).

However, in an IMT-2000 system, there are many frames for data transmission, which have a large amount of information bits, so that there may exist several channels having Walsh codes having shorter length (or spreading factor). For example, a Supplemental Channel may use a Walsh code of the shorter length, for high data rate transmission. The traffic data transmitted by the Supplemental Channel may include moving picture information (i.e., circuit data), which should be transmitted in real time, and general packet data. Such traffic data can be transmitted at variable data rates. For example, the Supplemental Channel can support the data rates of 9.6 Kbps, 19.2 Kbps, 38.4 Kbps, 76.8 Kbps, 153.6 Kbps, 307.2 Kbps and 614.4 Kbps. The Walsh codes have Walsh lengths (or spreading factors) of 256, 128, 64, 32, 16, 8 and 4 according to the respective data rates.

In addition, a Forward Common Common Channel (F-CCCH) of the IMT-2000 system also supports the variable data rates. For example, the Common Control Channel can support the data rates of 9.6 Kbps, 19.2 Kbps and 38.4 Kbps. At this point, the Walsh code has Walsh lengths (or spreading factors) of 256, 128 and 64 according to the respective data rates.

In the variable rate channel scheme, a channel frame is transmitted at a specific one of the data rates, and the data rate can be varied during the frame transmission according to a change of the channel environments. For example, when the channel environment improves during data transmission at the data rate of 19.2 Kbps, the data rate can be varied to the higher data rates of 38.4 Kbps to 614.6 Kbps. Otherwise, when the channel environment deteriorates, the data rate can be varied to the lower data rate of 9.6 Kbps. Here, the channel environment refers to any factor which can affect the data transmission. An increase in the data rate according to the channel environment causes a decrease in the Walsh length, thus making it difficult to allocate the Walsh codes, as described below with respect to FIG. 3. Before describing the problems, reference will be made to the structure of the Walsh codes shown in FIGS. 1 and 2.

FIG. 1 shows a structure of the general Walsh code set. Referring to FIG. 1, a Walsh code set W is comprised of N Walsh codes having a Walsh length N, and can be divided into 4 Walsh code sets of length N/2. If it is assumed that a set of N/2 Walsh codes having a Walsh length N/2 is defined as a Walsh code set W', the two upper Walsh code sets of length N/2 are each equivalent to Walsh code set W'. Further, the lower left Walsh code set of length N/2 is equivalent to the above Walsh code set W', and the lower right Walsh code set of length N/2 is equivalent to an inverted Walsh code set W'. For inversion of the Walsh code, a bit '1' is converted to '0' and a bit '0' to '1'.

Equation (1) below shows how to derive a Walsh code set of length 4 from a Walsh code set of length 2, in order to bring a better understanding of the Walsh code structure of FIG. 1. That is, the Walsh code set of length 4 correspond to the above stated Walsh code set W, and the Walsh code set of length 2 correspond to the above stated Walsh code set W'.

$$\begin{bmatrix} 0 & 0 \\ 0 & 1 \end{bmatrix} \Rightarrow \begin{bmatrix} 0 & 0 & 0 & 0 \\ 0 & 1 & 0 & 1 \\ 0 & 0 & 1 & 1 \\ 0 & 1 & 1 & 0 \end{bmatrix} \quad \text{[Equation 1]}$$

FIG. 2 shows a Walsh code set of length 256, which is obtained in the method of Equation (1). Referring to FIG. 2, a Walsh code set W is comprised of 256 Walsh codes having a Walsh length 256, and can be divided into 4 Walsh code sets of length 128. If it is assumed that a set of 128 Walsh codes having a Walsh length 128 is defined as a Walsh code set W', the two upper Walsh code sets of length 128 are each equivalent to the twice-repeated Walsh code set W'. Further, the lower left Walsh code set of length 128 is equivalent to the above Walsh code set W', and the lower right Walsh code set of length 128 is equivalent to an inverted Walsh code set $\overline{W'}$.

In addition, if it is assumed that a set of 64 Walsh codes having a Walsh length 64 is defined as a Walsh code set W'', the two upper Walsh code sets of length 64 of each Walsh code set W'' are each equivalent to the twice-repeated Walsh code set W''. Further, the lower left Walsh code set of length 64 of each Walsh code set W'' is equivalent to the above Walsh code set W'', and the lower right Walsh code set of length 64 is equivalent to an inverted Walsh code set $\overline{W'}$. Here, the structure of the Walsh code set W' is commonly applied to all the Walsh code sets W' constituting the Walsh code set W. Further, the Walsh code set $\overline{W'}$ also is constructed in the same manner as the Walsh code set W' as disclosed in the above. By using such structure of the Walsh codes, it is possible to reduce an interference (or correlation) between the users.

FIG. 3 shows a interference between two users according to the Walsh codes when the data rate is variable according to the channel environments. Referring to FIG. 3, a first user uses an $8^{th}$ Walsh code (which is a Walsh code having a Walsh number 8) at a data rate of 38.4 Kbps. A Walsh code of length 64 should be used to transmit data at the data rate of 38.4 Kbps as stated above. Therefore, the data of the first user is spread with an $8^{th}$ Walsh code of length 64 and transmitted at the data rate of 38.4 Kbps. At this data rate, it is possible to transmit 4 times the data which can be transmitted at the data rate of 9.6 Kbps. This becomes apparent when compared with the data transmission method of a fourth user, who transmits the data at the data rate of 9.6 Kbps using an $8^{th}$ Walsh code of length 256. More specifically, with regard to the data transmission method of the first user, a first code symbol is spread with a first 64-chip Walsh code (i.e., first 64 chips of the $8^{th}$ Walsh code), a second code symbol is spread with a second 64-chip Walsh code (i.e., second 64 chips of the $8^{th}$ Walsh code), a third code symbol is spread with a third 64-chip Walsh code (i.e., third 64 chips of the $8^{th}$ Walsh code), and a fourth code symbol is spread with a fourth 64-chip Walsh code (i.e., fourth 64 chips of the $8^{th}$ Walsh code).

A second user uses the $8^{th}$ Walsh code at a data rate of 19.2 Kbps. A Walsh code of length 128 should be used to transmit data at the data rate of 19.2 Kbps. Therefore, the data of the second user is spread with the $8^{th}$ Walsh code of length 128 and transmitted at the data rate of 19.2 Kbps. At this data rate, it is possible to transmit 2 times the data which can be transmitted at the data rate of 9.6 Kbps. This becomes apparent when compared with the data transmission method of the fourth user, who transmits the data at the data rate of 9.6 Kbps using the $8^{th}$ Walsh code of length 256. More specifically, with regard to the data transmission method of the second user, a first code symbol is spread with a first 128-chip Walsh code (i.e., leading 128 chips of the $8^{th}$ Walsh code), and a second code symbol is spread with a second 128-chip Walsh code (i.e., following 128 chips of the $8^{th}$ Walsh code).

A third user uses a $72^{nd}$ Walsh code of length 128 at the data rate of 19.2 Kbps. Two transmission symbols are spread with the corresponding 128-chip Walsh code ($72^{th}$ Walsh code).

Further, the fourth to seventh users use their unique Walsh codes of length 256 at the data rate of 9.6 Kbps. Each transmission symbol is spread with a 256-chip Walsh code. The unique Walsh codes used by the fourth to seventh users are $8^{th}$, $72^{th}$, $136^{th}$ and $200^{th}$ Walsh codes, respectively.

Next, reference will be made to an interference among the users using the different data rates and Walsh codes.

First, a description will be made of an interference between the first user and the third user on a 64-chip unit basis. The first symbol of the first user and the corresponding duration of the third user are spread with the same Walsh code W"8, thus causing an interference between the first user and the third user. That is, at the corresponding duration, the first user has an interference with the third user. This interference also occurs at the third symbol duration of the first user and the corresponding duration of the third user. Therefore, while transmitting the data of the first user, it is not possible to transmit the data of the third user.

Next, a description will be made of an interference between the first user and the fifth to seventh users on the 64-chip unit basis. The first symbol of the first user and the corresponding duration of the fifth to seventh users are spread with the same Walsh code W"8, thus causing an interference between the first user and the fifth to seventh users. That is, at the corresponding chip duration, the first user has a correlation with the fifth to seventh users. This correlation also occurs at the third symbol duration of the first user and the corresponding chip duration of the fifth user; at the second symbol duration of the first user and the corresponding chip duration of the sixth user; and at the fourth symbol duration of the first user and the corresponding chip duration of the seventh user. Therefore, while transmitting the data of the first user, it is not possible to transmit the data of the fifth to seventh users.

In other words, when there exists a user using a Walsh code of short length such as the first user, the users using Walsh codes of the longer length cannot use some of the Walsh codes due to the bad correlation property. For example, when there exists a user using an n-th Walsh code $W_n (0 \leq n < 64)$ of length 64 for a Walsh code of full length 256, a user using the longer Walsh length cannot use not only the n-th Walsh code $W_n$ but also (n+64)th, (n+128)th and (n+192)th Walsh codes. That is, several Walsh codes cannot be used because of one user. At this point, an increase in the data rate of the user will cause a decrease in the Walsh length, thus increasing unavailable Walsh codes in number. When a specific Walsh code is determined, it is possible to make a group of Walsh codes having Walsh numbers which cannot be used due to the bad correlation at the length of the determined Walsh code. The group of the Walsh codes is referred to as a Walsh pool.

In this circumstance, if the paging channel of the IMT-2000 system uses the $1^{st}$ to $7^{th}$ Walsh codes, it is not possible to use the data channels having the Walsh length 4 and 8 out of the 256 Walsh codes of length 256 for the reason described with reference to FIG. 3.

SUMMARY OF THE INVENTION

It is, therefore, an object of the present invention to provide a device and method for separately using a Walsh code to be allocated for an IMT-2000 Forward Common Channel and a Walsh code to be allocated for an IS-95 Forward Common Channel to increase utilization efficiency of the Walsh codes in a CDMA communication system.

It is another object of the present invention to provide a base station device for a CDMA communication system, which includes an IS-95 Forward Common Channel and an IMT-2000 Forward Common Channel and guarantees a variable rate channel for the IMT-2000 Forward Common Channel using a Walsh code from a Walsh pool, and a method for controlling the same.

It is further another object of the present invention to provide a mobile station device which can communicate with a base station device which includes an IS-95 Forward Common Channel and an IMT-2000 Forward Common Channel and guarantees a variable rate channel for the IMT-2000 Forward Common Channel using a Walsh code from a Walsh pool, and a method for controlling the same.

It is yet another object of the present invention to provide a device and method for separately allocating Forward Common Channels of different CDMA communication systems having 2 Generation and 3 Generation.

To achieve the above objects, there is provided a device for allocating a Forward Common Channel in a CDMA communication system. A device for allocating a forward common channel in a CDMA (Code Division Multiple Access) communication system, including: a plurality of channel transmitters; a storage medium for storing, as orthogonal code numbers for the forward common channel used in a second CDMA communication system, orthogonal code numbers which cannot maintain an orthogonality due to an orthogonal code that the forward common channel uses at a maximum data rate, the orthogonal code being used in a first CDMA communication system; and a controller for reading the orthogonal code numbers from the storage medium according to mobile station type information from a mobile station, and allocating a specific forward common channel such that forward common channel message is spread and transmitted by a corresponding one of the channel transmitters with a specific one of the read orthogonal code numbers.

BRIEF DESCRIPTION OF THE DRAWINGS

The above and other objects, features and advantages of the present invention will become more apparent from the following detailed description when taken in conjunction with the accompanying drawings in which:

FIG. 3 is a diagram for explaining an interference occurring between users when Walsh codes are allocated in a conventional method;

DETAILED DESCRIPTION OF THE PREFERRED EMBODIMENT

A preferred embodiment of the present invention will be described herein below with reference to the accompanying drawings. In the following description, well-known functions or constructions are not described in detail since they would obscure the invention in unnecessary detail.

The terms "orthogonal spreading" and "channel spreading" as used herein have the same meaning, and the terms "orthogonal code and Walsh code" as used herein also have the same meaning. Further, the term "user" refers to a subscriber requiring data transmission, and refers to data of a corresponding channel from the viewpoint of the system.

Figure 1:
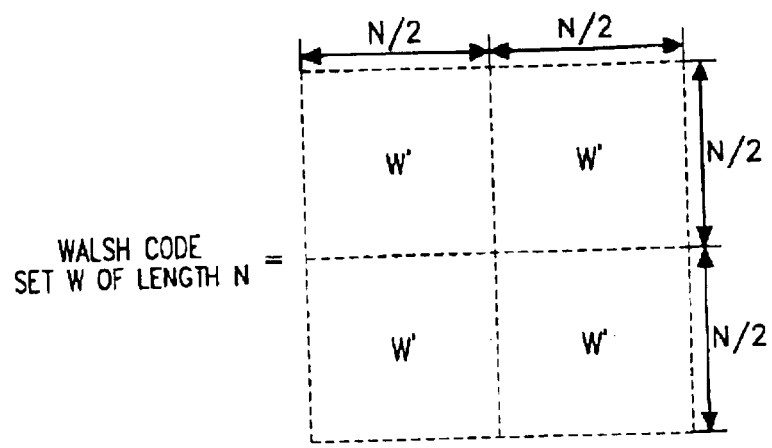
FIG. 1 is a diagram illustrating a structure of a general Walsh code set.
Figure 2:
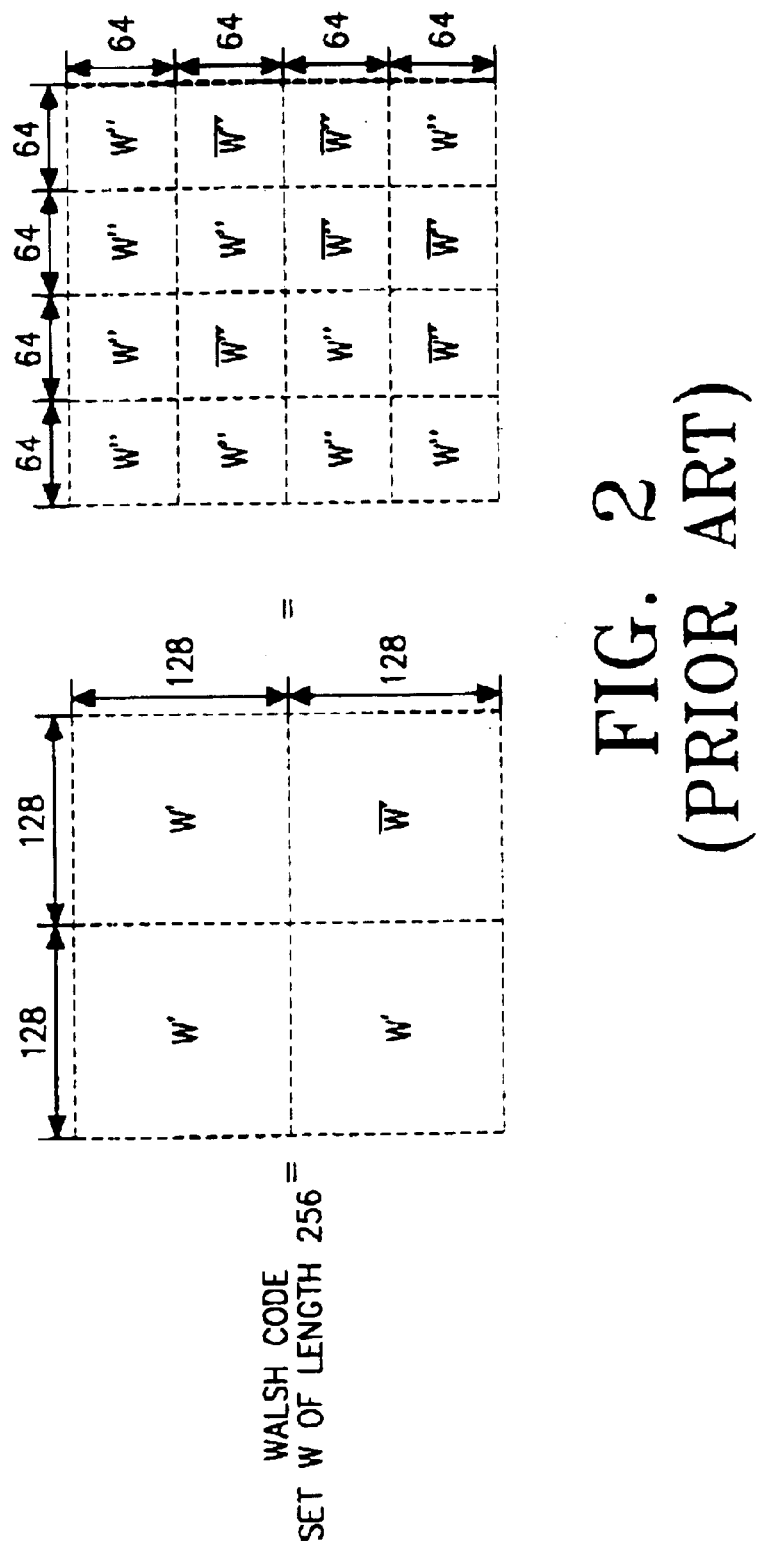
FIG. 2 is a diagram illustrating a set of Walsh codes having a Walsh length 256.
Figure 4:
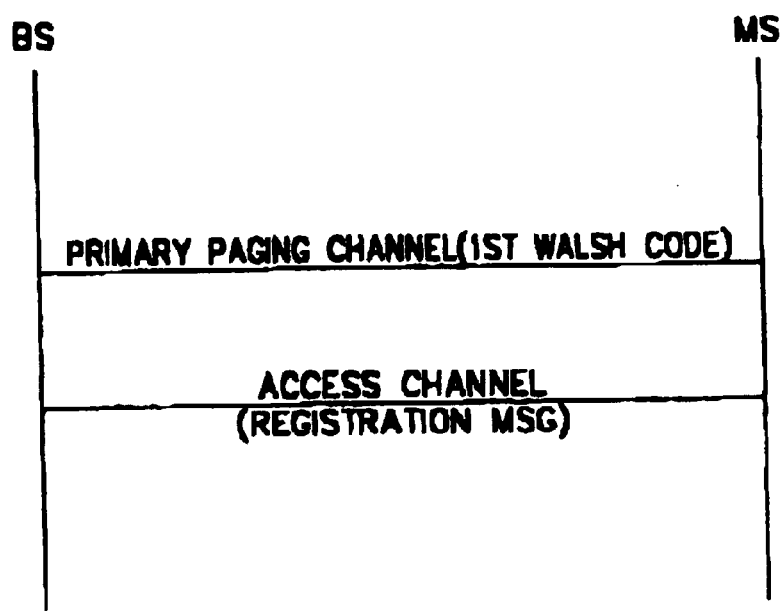
FIG. 4 is a flow diagram illustrating how an IMT-2000 base station shares paging channel information with an IMT-2000 mobile station.

FIG. 4 shows a flow diagram for explaining how a base station (BS) shares paging channel information with a mobile station (MS) in a second (i.e., IMT-2000) CDMA communication system. Referring to FIG. 4, the base station constantly transmits a paging message including information about the number of paging channels presently in use to every mobile station within a cell area there of over a primary paging channel. Upon power-on or entering into a cell area of a new base station, the mobile station monitors the primary paging channel transmitted from the base station. The message transmitted over the paging channel includes information about the paging channel presently used by the base station. The paging channel information can include the number of paging channels for the IMT-2000 mobile station or Walsh numbers of all the paging channels for the IMT-2000 mobile station. Therefore, upon receipt of the message from the base station, the mobile station determines a paging channel to use. Several methods for determining the paging channel have been suggested, but the paging channel is typically determined using a hash function. More specifically, the mobile hashes its electronic sequence number (ESN), which is a unique number, using the hash function and then determines a paging channel and a slot according to the hashed number. Here, the electron sequence number is used for identification of the mobile station. In addition, determination of the paging channel and the slot is equivalent to determination of a Walsh code to allocate the paging channel. After determination of the paging channel and the slot, the mobile station sends a registration message (or response message) to the base station over an access channel in acknowledgment of the paging channel message. The registration message includes the type and the electronic sequence number of the mobile station. Upon receipt of the registration message from the mobile station, the base station recognizes the type of the mobile station and then determines a paging channel to be used by the mobile station. To this end, the base station hashes the electronic sequence number of the mobile station using the hash function and determines the paging channel and slot, that the mobile station determined, using the hashed number. Since the base station and the mobile station commonly have the hash function, the same results are provided when determining the paging channel by hashing the same unique number. Therefore, when the paging channel to be used by the base station and the mobile station is determined, the base station sends a control message to the mobile station over the determined paging channel.

Figure 5:
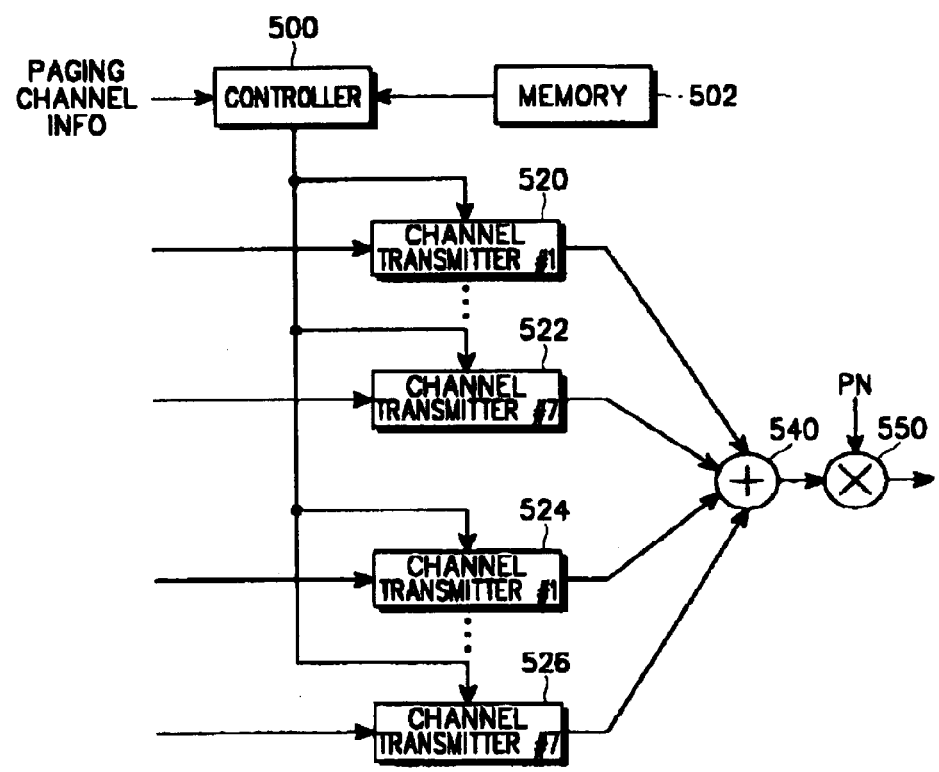
FIG. 5 is a block diagram illustrating a scheme for controlling channel transmitters using a Walsh pool according to an embodiment of the present invention.

FIG. 5 shows a device for allocating a paging channel using a Walsh pool for a paging channel of the IMT-2000 communication system and controlling data transmission through the allocated paging channel. The device separately manages a Walsh code used for allocating a paging channel in the first CDMA (i.e., IS-95) communication system and a Walsh code used for allocating a paging channel in the second CDMA (i.e., IMT-2000) communication system.

Referring to FIG. 5, a memory 502 separately stores the Walsh code number for the first CDMA communication system and the Walsh code number for the second CDMA communication system. That is, the memory 502 stores the $1^{st}$ to $7^{th}$ Walsh codes numbers for the first CDMA communication system. To the contrary, the memory 502 stores a paging Walsh pool consisted of the Walsh code numbers determined by one of the $1^{st}$ to $7^{th}$ Walsh codes numbers for the second CDMA communication system. The paging Walsh pool stored in the memory 502 is comprised of a Walsh number corresponding to the paging channel which is commonly used with the first CDMA communication system, and also comprises a plurality of Walsh numbers determined depending on a Walsh length on the basis of the above Walsh number corresponding to the paging channel. Further, the memory 502 provides the Walsh pool stored therein under the control of a controller 500. For example, it will be assumed herein that the Walsh code out of the Walsh codes used in the first CDMA communication system has a Walsh number 1 (primary paging channel walsh number) and a Walsh length of 16. In this case, the paging Walsh numbers which can be determined by the Walsh code number 1 and the Walsh length are {1,17,33,49,81,97,113}.

The memory 502 stores all the Walsh code numbers corresponding to the determined paging Walsh numbers in the form of the Walsh pool. Of course, the paging Walsh pool should include any one of the $1^{st}$ to $7^{th}$ Walsh code numbers used in the first CDMA communication system.

When the mobile station requires paging, paging information, i.e., information about the mobile station is provided to the controller 500. The paging information includes the type and the unique number of the mobile station that requires paging.

Figure 7:
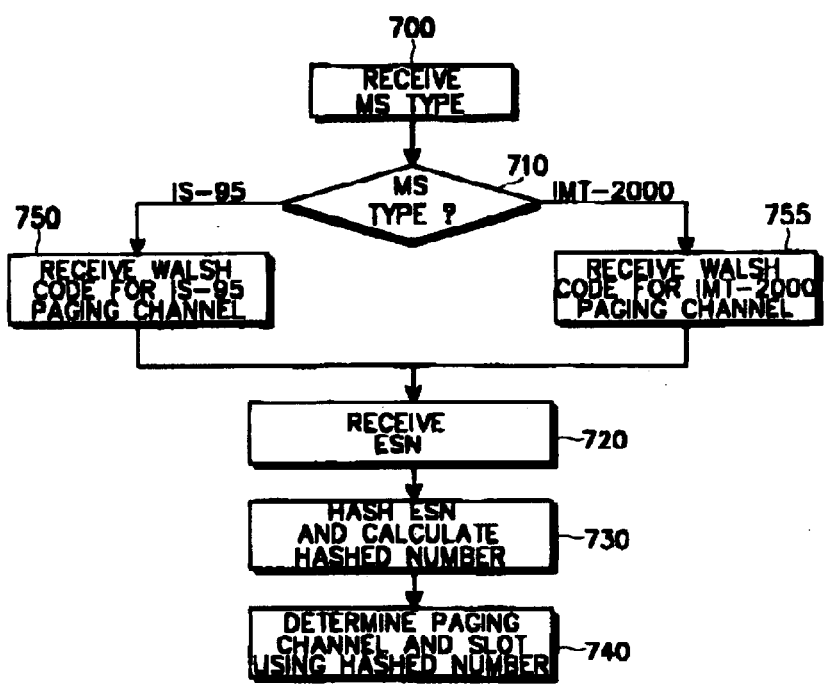
FIG. 7 is a flow chart illustrating a procedure for allocating a paging channel in the controller of FIG. 5 according to an embodiment of the present invention.

Upon receipt of the paging channel information, the controller 500 recognizes the type of the mobile station from the received paging information. At this point, when it is judged that the mobile station is a mobile station for the first CDMA communication system (i.e., IS-95 mobile station), the controller 500 reads a Walsh pool for the paging Walsh number of the first CDMA communication system from the memory 502. Further, the controller 500 provides paging channel transmitters 520–526 with a control message for the paging channel and the slot to be used by the mobile station, using the unique number of the mobile station which requires paging according to the input information. A procedure for allocating the paging channel in the controller 500 is illustrated in FIG. 7.

When the controller 500 outputs the control message for the paging channel and the slot to be used by the mobile station, the paging channel transmitters 520–526 receive the corresponding Walsh codes and slots from the controller 500, spreads the input signals DATA1–DATA7 with the corresponding Walsh codes, and outputs the spread signals as a transmission message. In the case where the paging transmitters are constructed such that the Walsh numbers are fixedly assigned to the respective channel transmitters, the Walsh number is determined when the paging to be used is determined. For the IS-95 mobile station, the control message is provided to the channel transmitters in an IS-95 paging channel block, and for the IMT-2000 mobile station, the control message is provided to the channel transmitters in an IMT-2000 paging channel block at the corresponding slots of the paging channel determined by hashing the unique number of the mobile station.

When the messages to be sent to the several mobile stations are assembled in the above manner, the transmission messages output from the respective channel transmitters 520–526 are added by an adder 540 and then multiplied by a PN sequence by a multiplier 550.

Meanwhile, in the embodiment, a description has been made for generating a Walsh pool (paging Walsh pool) including a priority paging channel (Walsh number 1), to renumber the Walsh number to be used in six remaining paging channels, in the numbers of the Walsh pool.

However, in the first CDMA communication system (IS-95), the walsh number used in the paging channel as well as the walsh number of the pilot channel and the walsh number of the sync channel are fixed. Since the second CDMA communication system is a system maintaining a backward compatibility with the IS-95 system, the orthogonal number of the pilot channel and the sync channel in the IMT-2000 system should be fixed in the same manner as in the IS-95 system.

Therefore, in case of fixing the orthogonal code numbers such as the channels for high rate of data service of the supplemental channel, all numbers of the paging channel can be renumbered in numbers existing in the paging Walsh pool. However, in another method, except the paging Walsh pool, another Walsh pool including the orthogonal number used in the sync channel and the orthogonal code number used in the pilot channel can be generated in the same manner as above. And thus, the paging Walsh pool and the other walsh pool have respectively the orthogonal numbers different to each other. Accordingly, in the IMT-2000 system, except for the priority paging channel orthogonal code number, the pilot channel orthogonal code number and the sync channel orthogonal code numbers included in said two Walsh pools, numbers of other paging channels which should fix the orthogonal numbers are six.

At this time, it is possible to divide and fix the orthogonal numbers of the remaining paging channels which should be fixed, in the orthogonal numbers of two Walsh pools. Accordingly, the walsh pool which can transmit data having short walsh code can be renumbered much more.

Figure 6:
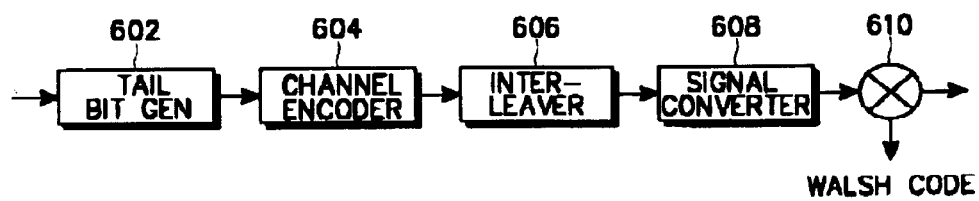
FIG. 6 is a block diagram illustrating one of the channel transmitters of FIG. 5.

FIG. 6 shows a structure of the channel transmitters 520–526 of FIG. 5, by way of example. Referring to FIG. 6, a tail bit generator 602 generates 8 tail bits for indicating termination of the control message frame and adds the generated tail bits to CRC-added data provided from a CRC generator not shown in the figure. A channel encoder 604 encodes the signal output from the tail bit generator 602. A Convolutional Encoder or a Turbo Encoder is typically used for the channel encoder 604. An interleaver 606 interleaves symbol data output from the channel encoder 604. A signal converter 608 converts a level of the signal output from the interleaver 606. A multiplier 610 multiplies the signal output from the signal converter 608 by an orthogonal code to orthogonally spread the input signal.

A detailed description will be now made of an embodiment of the present invention. The embodiment includes a process for generating a paging Walsh pool and a process for allocating a paging channel using the generated Walsh pool.

First, a detailed description will be made of a process for generating a Walsh pool comprised of Walsh numbers to be used for allocating the paging channel in the first CDMA communication system. When there exists a user using an n-th Walsh code ($0 \leq n < 64$) of Walsh length 64 where the full length of the Walsh code is 256, a user using the longer Walsh length cannot use $(n+64)^{th}$, $(n+128)^{th}$ and $(n+192)^{th}$ Walsh codes $W_{n+64}$, $W_{n+128}$, and $W_{n+192}$ as well as the n-th Walsh code $W_n$.

When the Walsh length for the maximum data rate of the primary user is L and the n-th Walsh code is used, a set $\{W_{n+iL} | 0 \leq i < (256/L)\}$, where i is an integer, will be referred to as a Walsh pool. Although the full Walsh length is restricted to 256 in the embodiment, the full Walsh length is variable. In this case, where the Walsh length is 64, the Walsh pool is $\{W_n, W_{n+64}, W_{n+128}, W_{n+192}\}$.

In general, the number of paging channels which can be commonly used with the IS-95 communication system is 1 to 7. Since the Walsh number 1 is used for the primary paging channel, the Walsh number 1 is allocated when there is required only one paging channel; the $1^{st}$ and $17^{th}$ Walsh codes can be allocated when there are required two IMT-2000 paging channels; and the $1^{st}$, $17^{th}$ and $33^{rd}$ Walsh codes can be allocated when there are required three IMT-2000 paging channels, thereby making it possible to transmit the Supplemental Channels having the short Walsh length.

For example, the paging Walsh pool for the IMT-2000 system can include a set of Walsh numbers {1,17,33,49,81,97,113}, wherein the Walsh number 1 is for the primary paging channel and the other Walsh numbers are defined as n+iL (where n is the Walsh number for the primary paging channel, L is the Walsh length and i is an integer less than 256/L).

For L=16, the Walsh pool '1+i16' includes a Walsh code number having a Walsh number 65 (for i=4). However, since the IS-95 system primarily uses the Walsh number 1 for the paging channel and uses the Walsh code of length 64, the $65^{th}$ Walsh code and the $1^{st}$ Walsh code are recognized as the same Walsh code. The existing IS-95 system uses 64 Walsh codes of length 64. If the IS-95 mobile station is in the cell area of the IMT-2000 system and the IMT-2000 system provides the IMT-2000 mobile station with the paging information using the $65^{th}$ Walsh code, the IS-95 mobile station receives the signal combined of the paging information provided with the $65^{th}$ Walsh code and the paging information provided with the $1^{st}$ Walsh code. Thus, the paging information provided through the $1^{st}$ Walsh code may be subjected to substantial interference. Therefore, the Walsh pool for the paging channel of the IMT-2000 system includes 7 Walsh numbers, excluding the Walsh number 65. The number of the Walsh codes in the paging Walsh pool is initially set up to a maximum of 7 by the base station. Since the order of using the Walsh codes can be previously determined, the mobile station can recognize the paging Walsh pool, if the number of the paging channels used by the base station is known. That is, when the base station uses only one paging channel, the Walsh number 1 is used; when the base station uses two paging channels, the Walsh numbers 1 and 17 are used; and when the base station uses three paging channels, the Walsh numbers 1, 17 and 33 are used if the order of using the Walsh code number is {1, 17, 33, 49, 81, 97, 113} as stated above.

Next, a detailed description will be made of allocating a paging channel with reference to FIG. 7. In step 700, the controller 500 receives paging information including information about the type of a mobile station, that requires paging, from the mobile station over the access channel. The base station can acknowledge a type of the mobile station by the registration message received through an access channel. Upon receipt of the paging information, the controller 500 analyzes the type of the mobile station that presently requires paging according to the paging information, in step 710. Through the analysis, the controller 500 determines whether the mobile station is an IMT-2000 mobile station or an IS-95 mobile station. That is, the controller 500 determines whether the mobile station that has transmitted the paging channel information over the access channel is a mobile station for the first CDMA communication system or a mobile station for the second CDMA communication system. When it is determined in step 710 that the mobile station is the IS-95 mobile station, the controller 500 proceeds to step 750 to read the Walsh code number for the IS-95 paging channels from the memory 502. Here, the Walsh code number for the IS-95 paging channels read from the memory 502 are the Walsh code number which is commonly used in the first CDMA communication system. Those are the $1^{st}$ to $7^{th}$ Walsh codes. However, when it is determined in step 710 that the mobile station is the IMT-2000 mobile station, the controller 500 proceeds to step 755 to read the Walsh code number for the IMT-2000 paging channels from the memory 502 according to the paging information. Here, the Walsh code numbers read from the memory 502 are in the elements of the paging Walsh pool.

Meanwhile, after reading the Walsh numbers in steps 750 and 755, the controller 500 analyzes a unique number of the mobile station from the paging information received from the mobile station, in step 720. After recognizing the unique number of the mobile station through the analysis, the controller 500 calculates a hashed number using a hash function in step 730. The used hash function should be identical to the hash function used in the mobile station. After calculating the hashed number, the controller 500 determines a Walsh number and a slot for allocating a paging channel to the mobile station according to the calculated hashed number to generate a control message, in step 740. The control message is used for allocating the paging channels to the channel transmitters 520–526.

Figure 8:
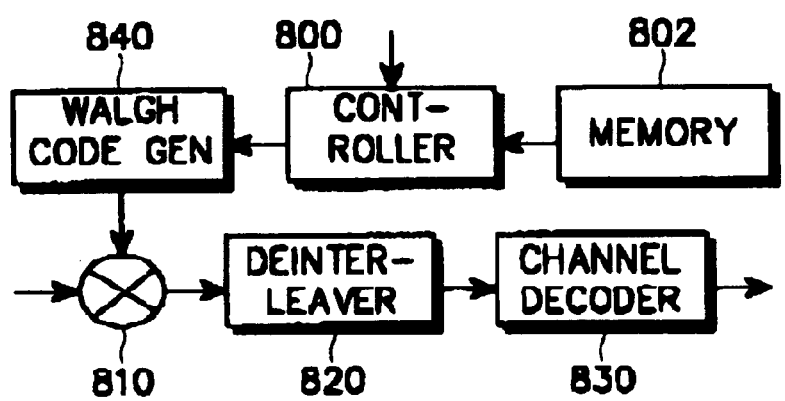
FIG. 8 is a block diagram illustrating a channel receiver of a mobile station, which corresponds to the channel transmitters (520–526) of FIG. 5.
Figure 9:
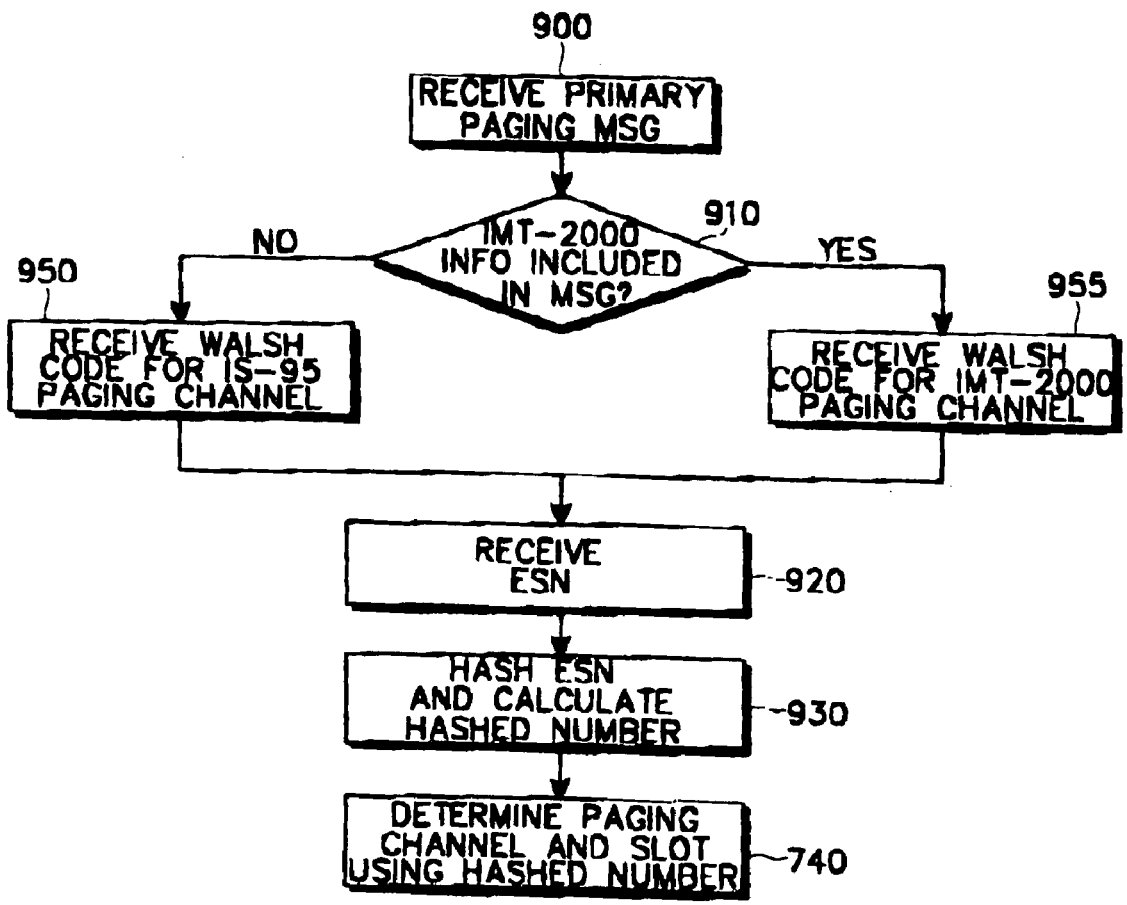
FIG. 9 is a flow chart illustrating a procedure for allocating a paging channel in the controller of FIG. 8.

As described above, in one embodiment of the present invention, a high rate of data service can be provided by using the paging channel Walsh code without change in the IS-95 system and by using said paging Walsh pool in the IMT-2000 system FIG. 8 shows a channel receiver of a mobile station, which corresponds to the channel transmitters 520–526 of FIG. 5. Referring to FIG. 8, the mobile station receives a paging message from the base station over the primary paging channel (which is a paging channel assigned the $1^{st}$ Walsh code) as shown in FIG. 4. A controller 800 examines the number of paging channels which can be allocated in the base station, using the paging message. The controller 800 determines a Walsh number for the paging channel by hashing the number of the paging channels and the unique number of the mobile station, using a unique hashing function, and generates a control message so as to allocate the paging channel according to the determined Walsh code. The used hash function is identical to a hash function used in the base station. A process for allocating the paging channel in the controller 800 is illustrated in FIG. 9, described further below. The controller 800 provides a Walsh code generator 840 with the control message indicating the Walsh number for the paging channel, and the Walsh code generator 840 then generates a Walsh code corresponding to the Walsh number and provides the generated Walsh code to a multiplier 810. The multiplier 810 despreads a transmission message with the Walsh code provided from the Walsh code generator 840. A deinterleaver 820 deinterleaves the despread signal from the multiplier 810, and a channel decoder 830 decodes the deinterleaved signal from the deinterleaver 820 and outputs decoded information bits.

FIG. 9 shows a procedure for allocating a paging channel in the controller 800. With reference to FIG. 9, a detailed description will be made of a procedure for determining a paging channel depending on paging information provided from the base station over the primary paging channel. In step 900, the controller 800 receives a decoded primary paging message. Thereafter, the controller 800 determines in step 910 whether or not the decoded primary paging message includes paging information for the IMT-2000 mobile station. When the primary paging message does not include the paging information for the IMT-2000 mobile station, the controller 800 proceeds to step 950 to read the Walsh code number for the IS-95 paging channels from the memory 802. Otherwise, when the primary paging message includes the paging information for the IMT-2000 mobile station, the controller 800 proceeds to step 955 to read the Walsh code number for the IMT-2000 paging channels from the memory 802. Here, the Walsh code number read from the memory 802 are in the form of a Walsh pool.

Meanwhile, after reading the Walsh numbers in steps 950 and 955, the controller 800 receives its unique number in step 920. For example, the unique number is stored in the memory 802 and is output at the request of the controller 800. Upon receipt of the unique number, the controller 800 calculates a hashed number using a hash function in step 930. The used hash function should be identical to the hash function used in the base station. After calculating the hashed number, the controller 800 determines a Walsh number for allocating a paging channel to the base station according to the calculated hashed number to generate a control message, in step 940. The control message is provided to the Walsh code generator 840 to generate a Walsh code for allocating the paging channel.

As described above, the IMT-2000 CDMA communication system supporting the variable data rate using a variable Walsh length uses a Walsh code for the Forward Common Channel, including paging channel, which is different from the Walsh code for the IS-95 Forward Common Channel, including paging channel. Therefore, the IMT-2000 CDMA communication system supporting the variable data rate can use the short Walsh code, thereby increasing data transmission efficiency. That is, it is possible to efficiently use the limited Walsh code resources.

While the invention has been shown and described with reference to a certain preferred embodiment there of, it will be understood by those skilled in the art that various changes in form and details may be made therein without departing from the spirit and scope of the invention as defined by the appended claims.

What is claimed is:

1. A device for allocating a forward common channel in a CDMA (Code Division Multiple Access) communication system, comprising:
   a plurality of channel transmitters for spreading a forward common channel message according to allocated orthogonal code;
   a storage medium for storing a first orthogonal code number for a forward common channel used in a first CDMA communication system and second orthogonal code numbers for a forward common channel used in a second CDMA communication system, wherein the second orthogonal code numbers are generated by sequentially adding multiples of an orthogonal code length used at a maximum data rate to the first orthogonal code number; and
   a controller for allocating an orthogonal code number from among the first and second orthogonal code numbers stored in the storage medium according to mobile station type information from a mobile station to a channel transmitter from among the plurality of channel transmitters,
   wherein a length of the first orthogonal code is equal to a length of each second orthogonal code, and the lengths of the first and second orthogonal codes are longer than the orthogonal code length used at a maximum data rate.

2. The device as claimed in claim 1, wherein the second orthogonal code numbers are generated within a maximum length of an orthogonal code.

3. The device as claimed in claim 1, wherein the mobile station type information is information for identifying a mobile station for the first CDMA communication system and a mobile station for the second CDMA communication system.

4. The device as claimed in claim 3, wherein the controller, when it is determined from the mobile station type information that the mobile station is for the second CDMA communication system, reads from the storage medium the orthogonal codes for the forward common channel, stored for the second CDMA communication system, and allocates a specific one of the read orthogonal code numbers such that forward common channel message is spread and transmitted by a corresponding one of the channel transmitters with the allocated orthogonal code number.

5. The device as claimed in claim 4, wherein the first CDMA communication system is an IS-95 CDMA communication system.

6. The device as claimed in claim 5, wherein the second CDMA communication system is a next generation CDMA communication system.

7. The device as claimed in claim 1, wherein the mobile station type information includes unique number information of the mobile station.

8. The device as claimed in claim 7, wherein the controller determines a hashed number using a hash function based on the unique number of the mobile station, and selects one of the read orthogonal code numbers to allocate the forward common channel corresponding to the determined hashed number.

9. A device for allocating a forward common channel in a CDMA communication system, comprising:
   a plurality of channel receivers for despreading a forward common channel message according to allocated orthogonal code;
   a storage medium for storing a first orthogonal code number for a forward common channel used in a first CDMA communication system and second orthogonal code numbers for a forward common channel used in a second CDMA communication system, wherein the second orthogonal code numbers are generated by sequentially adding multiples of an orthogonal code length used at a maximum data rate to the first orthogonal code number; and
   a controller for allocating an orthogonal code number from among the first and the second orthogonal code numbers stored in the storage medium according to a paging message received from a base station over a primary paging channel to a channel receiver from among the plurality of channel receivers,
   wherein a length of the first orthogonal code is equal to a length of each second orthogonal code, and the lengths of the first and second orthogonal codes are longer than the orthogonal code length used at a maximum data rate.

10. The device as claimed in claim 9, wherein the second orthogonal code numbers are generated within a maximum length of an orthogonal code.

11. The device as claimed in claim 9, wherein the paging message from the base station includes a number of paging channels.

12. The device as claimed in claim 11, wherein the controller, when it is determined from the paging message that the base station is for the second CDMA communication system, reads from the storage medium the orthogonal codes for the forward common channel, stored for the second CDMA communication system, and allocates a specific one of the read orthogonal code numbers such that forward common channel message is despread by a corresponding one of the channel receivers with the allocated orthogonal code number.

13. The device as claimed in claim 12, wherein the first CDMA communication system is an IS-95 CDMA communication system.

14. The device as claimed in claim 13, wherein the second CDMA communication system is a next generation CDMA communication system.

15. The device as claimed in claim 11, wherein the controller determines a hashed number using a hash function based on a number of paging channels and a unique number of the mobile station, included in the paging message, and selects one of the read orthogonal code numbers to allocate a forward common channel corresponding to the determined hashed number.

16. A method for allocating a forward common channel in a CDMA communication system including a plurality of channel transmitters, the method comprising the steps of:
   storing a first orthogonal code number for a forward common channel used in a first CDMA communication system and second orthogonal code numbers for a forward common channel used in a second CDMA communication system, wherein the second orthogonal code numbers are generated by sequentially adding multiples of an orthogonal code length used at a maximum data rate to the first orthogonal code number; and
   allocating an orthogonal code number from among the first and the second orthogonal code numbers according to mobile station type information from a mobile station to a channel transmitter from among the channel transmitters,
   wherein a length of the first orthogonal code is equal to a length of each second orthogonal code, and the lengths of the first and second orthogonal codes are longer than the orthogonal code length used at a maximum data rate.

17. The method as claimed in claim 16, wherein the second orthogonal code numbers are generated within a maximum length of an orthogonal code.

18. The method as claimed in claim 16, wherein the mobile station type information is information for identifying a mobile station for the first CDMA communication system and a mobile station for the second CDMA communication system.

19. The method as claimed in claim 18, wherein when it is determined from the mobile station type information that the mobile station is for the second CDMA communication system, the orthogonal codes for the forward common channel, stored for the second CDMA communication system, are read and a specific one of the read orthogonal code numbers is allocated such that forward common channel message is spread and transmitted by a corresponding one of the channel transmitters with the allocated orthogonal code number.

20. The method as claimed in claim 19, wherein the first CDMA communication system is an IS-95 CDMA communication system.

21. The method as claimed in claim 20, wherein the second CDMA communication system is a next generation CDMA communication system.

22. The method as claimed in claim 16, wherein the mobile station type information includes unique number information of the mobile system.

23. The method as claimed in claim 22, further comprising the step of determining a hashed number using a hash function based on the unique number of the mobile station, and selecting one of the read orthogonal code numbers to allocate the forward common channel corresponding to the determined hashed number.

24. A method for allocating a forward common channel in a CDMA communication system including a plurality of channel receivers, the method comprising the steps of:
   storing a first orthogonal code number for a forward common channel used in a first CDMA communication system and second orthogonal code numbers for a forward common channel used in a second CDMA communication system, wherein the second orthogonal code numbers are generated by sequentially adding multiples of an orthogonal code length used at a maximum rate to the first orthogonal code number; and
   allocating an orthogonal code number from among the first and the second orthogonal code numbers according to a paging message received from a base station over a primary paging channel to a channel receiver from among the plurality of channel receivers,
   wherein a length of the first orthogonal code is equal to a length of each second orthogonal code, and the lengths of the first and second orthogonal codes are longer than the orthogonal code length used a maximum data rate.

25. The method as claimed in claim 24, wherein the second orthogonal code numbers are generated within a maximum length of an orthogonal code.

26. The method as claimed in claim 24, wherein the paging message from the base station includes a number of paging channels.

27. The method as claimed in claim 26, wherein when it is determined from the paging message that the base station is for the second CDMA communication system, the orthogonal codes for the forward common channel, stored for the second CDMA communication system, are read and a specific one of the read orthogonal code numbers is allocated such that forward common channel message is despread by a corresponding one of the channel receivers with the allocated orthogonal code number.

28. The method as claimed in claim 27, wherein the first CDMA communication system is an IS-95 CDMA communication system.

29. The method as claimed in claim 28, wherein the second CDMA communication system is a next generation CDMA communication system.

30. The method as claimed in claim 26, further comprising the step of determining a hashed number using a hash function based on a number of paging channels and a unique number of the mobile station, included in the paging message, and selecting one of the read orthogonal code numbers to allocate a forward common channel corresponding to the determined hashed number.

31. A device for allocating a forward common channel in a CDMA (Code Division Multiple Access) communication system, comprising:
   a plurality of channel transmitter;
   a storage medium for storing, as second orthogonal codes, orthogonal codes which cannot maintain an orthogonality due to a predetermined first orthogonal code, the stored orthogonal codes being codes that are non-orthogonal with the first orthogonal code; and
   a controller for reading one of the second orthogonal codes from the storage medium according to allocation request of the forward common channel and allocating a specific forward common channel such that forward common channel message is spread and transmitter by a corresponding one of the channel transmitters by the read orthogonal code.

32. The device as claimed in claim 31, wherein the second orthogonal codes include a number of the first orthogonal code and numbers generated by sequentially adding multiples of an orthogonal code length used at the maximum data rate on a forward channel to the number of the first orthogonal code, and the numbers are less than the maximum number of the orthogonal code capable of being allocated to the forward channel.

33. The device as claimed in claim 31, wherein the controller is configured to perform reading one of the second orthogonal codes from the storage medium by means of a mobile station type information requesting allocation of the forward common channel and hashed number determined by hash function using unique number information of the mobile station.

34. A device for allocating a forward common channel in a CDMA (Code Division Multiple Access) communication system, comprising:
   a plurality of channel receivers;
   a storage medium for storing, as second orthogonal codes, orthogonal codes which cannot maintain an orthogonality due to a predetermined first orthogonal code, the stored orthogonal codes being codes that are non-orthogonal with the first orthogonal code; and
   a controller for reading one of the second orthogonal codes from the storage medium according to a paging message received form a base station over a primary paging channel, and allocating a specific forward common channel such that forward common channel message is despread and decoded by a corresponding one of the channel receivers by the read orthogonal code number.

35. The device as claimed in claim 34, wherein the second orthogonal codes include a number of the first orthogonal code and numbers generated by sequentially adding multiples of an orthogonal code length used at the maximum data rate on forward channel to the number of the first orthogonal code, and the numbers are less than the maximum number of the orthogonal code capable of being allocated to the forward channel.

36. The device as claimed in claim 34, wherein the controller is configured to perform reading one of the second orthogonal codes from the storage medium by means of a mobile station type information requesting allocation of the forward common channel and hashed number determined by hash function using unique number information of the mobile station.

37. A method for allocating a forward common channel in a base station of a CDMA communication system including a plurality of channel transmitters, the method comprising the steps of:
   storing, as second orthogonal code numbers, orthogonal codes, which cannot maintain an orthogonality due to a predetermined first orthogonal code, the stored orthogonal codes being codes that are non-orthogonal with the first orthogonal code;
   reading one of the second orthogonal codes from the storage medium according to allocating requesting of the forward common channel; and
   allocating a specific forward common channel such that forward common channel message is spread and transmitter by a corresponding one of the channel transmitters by the read orthogonal code.

38. The method as claimed in claim 37, wherein the second orthogonal codes include a number of the first orthogonal code and numbers generated by sequentially adding multiples of an orthogonal code length used at the maximum data rate on a forward channel to the number of the first orthogonal code, and the numbers are less than the maximum number of the orthogonal code capable of being allocated to the forward channel.

39. The method as claimed in claim 37, wherein the step of reading one of the second orthogonal codes from the storage medium is accomplished by a mobile station type information requesting allocation of the forward common channel and hashed number determined by hash function using unique number information of the mobile station.

40. A method for allocating a forward common channel in a mobile station of a CDMA communication system including a plurality of channel receivers, the method comprising the steps of:
   storing, as second orthogonal code numbers, orthogonal codes, which cannot maintain an orthogonality due to a predetermined first orthogonal code, the stored orthogonal codes being codes that are non-orthogonal with the first orthogonal code;
   reading one of the second orthogonal codes from the storage medium according to a paging message received from a base station over a primary paging cannel; and
   allocating a specific forward common channel such that forward common channel message is despread and decoded by a corresponding one of the channel receivers by the read orthogonal code number.

41. The method as claimed in claim 40, wherein the second orthogonal codes include a number of the first orthogonal code and numbers generated by sequentially adding multiples of an orthogonal code length used at the maximum data rate on a forward channel to the number of the first orthogonal code, and the numbers are less than the maximum number of the orthogonal code capable of being allocated to the forward channel.

42. The method as claimed in claim 40, wherein the step of reading one of the second orthogonal codes from the storage medium is accomplished by a mobile station type information requesting allocation of the forward common channel and hashed number determined by hash function using unique number information of the mobile station.

* * * * *